United States Patent [19]

Sindle

[11] 4,015,232
[45] Mar. 29, 1977

[54] ULTRASONIC DISTANCE DETECTOR FOR VEHICLES

[76] Inventor: Thomas Sindle, 15 Roosevelt St., Staten Island, N.Y. 10304

[22] Filed: Aug. 5, 1975

[21] Appl. No.: 602,054

[52] U.S. Cl. .................................. 340/1 T; 340/32; 340/38 S; 343/112 CA
[51] Int. Cl.[2] ........................................... G01S 9/66
[58] Field of Search ............ 340/1 R, 1 T, 32, 38 S; 343/112 CA, 7 VM

[56] References Cited

UNITED STATES PATENTS

| | | | |
|---|---|---|---|
| 2,974,304 | 3/1961 | Nordlund | 340/1 R |
| 3,842,397 | 10/1974 | Sindle | 340/1 R |

Primary Examiner—Richard A. Farley
Attorney, Agent, or Firm—Allison C. Collard

[57] ABSTRACT

An ultrasonic distance detector for vehicles using a plurality of transducers located around the sides of the vehicle and connected to transmitters for sending sonic pulses to distant objects. Each of the transducers is connected to a receiver for detecting sonic echoes from too close objects. The output of each receiver is connected to individual indicator lamps and a warning device so that if any of the lamps are energized, the driver is warned that a part of the vehicle is in danger of a collision. The front and rear transducers are separated from the side transducers so that there can be an independent measurement dependent upon the speed of the vehicle.

10 Claims, 16 Drawing Figures

ULTRASONIC DISTANCE DETECTOR FOR VEHICLES

This invention relates to an ultrasonic measuring device particularly suitable for motor vehicles.

More specifically, this invention relates to an ultrasonic distance calculator and warning device particularly suitable for vehicles such as automobiles for detecting the proximity of the vehicle with respect to both stationary and moving objects.

In the ordinary uses of a vehicle such as a truck or car, there are certain "blind" spots surrounding the vehicle which cannot be easily observed by the motorist. These blind spots are usually located at the rear corners of the vehicle where the motorist finds certain obstructions in his way blocking full view of these rear corners. In another instance, when a motorist is pulling into or backing out of a parking space, it is difficult for the motorist to maintain his attention simultaneously on all sides of the vehicle in order to avoid hitting adjacent objects such as other cars. Moreover, if the vehicle is travelling and comes too close to another moving vehicle, there is a danger of a front or rear end collision.

In the prior patented art, there have been provided ultrasonic devices attached to the rear of vehicles such as trucks to measure the distance between the tailgate of the vehicle and a loading platform. Other vehicles have been provided with ultrasonic listening devices for providing a warning when the noise level of an adjacent moving object or vehicle reaches a certain threshhold level, as in applicant's prior U.S. Pat. No. 3,842,397. In the latter patent, no provision was disclosed for detecting unsafe distances in front and behind the travelling vehicle dependent on the speed of the vehicle.

Accordingly, the present invention provides a plurality of ultrasonic sending and receiving devices positioned in various locations around the outer surface of a vehicle such as an automobile for providing a warning to the driver when one of the vehicle surfaces closes to a predetermined distance with respect to an external object, and particularly in front or back of the vehicle depending on the speed of the vehicle. Each of the vehicle's ultrasonic detectors are coupled to an indicator and warning device mounted adjacent to the driver, and in the case of an automobile, mounted on the dashboard. The indicating device includes a plurality of lamps each connected to one of the ultrasonic distance detection devices so that the driver can be warned as to the exact location of any portion of the vehicle which might be in danger of a collision.

It is therefore an object according to the present invention to provide an ultrasonic distance measuring apparatus for sensing the proximity of different sides of a vehicle with respect to external objects.

It is another object according to the present invention to provide an ultrasonic distance sensing apparatus which provides the driver of a vehicle with an indication and a warning that a particular portion of the vehicle is in close proximity to external objects.

It is still another object according to the present invention to provide a proximity detection device which is simple in design, reliable in operation and inexpensive in cost.

Other objects and features of the present invention will become apparent from the following detailed description considered in connection with the accompanying drawings which disclose the embodiments of the invention. It is to be understood, however, that the drawings are designed for the purposes of illustration only and not as a definition of the limits of the invention.

In the drawings wherein similar reference characters denote similar elements throughout the several views.

Figure 14:
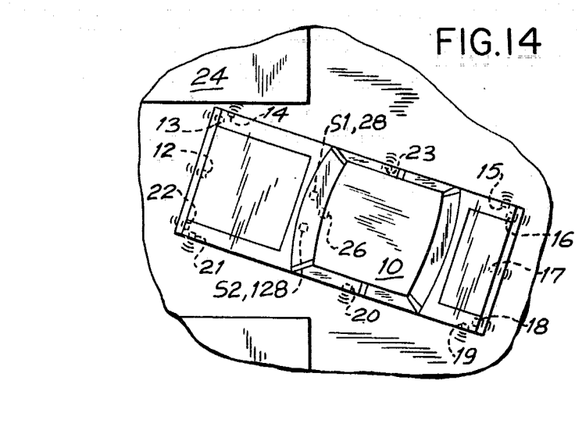
FIG. 14 is a top plan view of the vehicle in traffic showing the positioning of the sensing and panel devices.

Referring first to FIG. 14, there is shown a vehicle 10 such as an automobile travelling adjacent to another vehicle 24. Vehicle 10 includes a plurality of ultrasonic sensing devices, 12, 13, 14, 15, 16, 17, 18, 19, 20, 21, 22, and 23 positioned around the vehicle preferably along external vertical surfaces. Ultrasonic device 12 is preferably mounted on the front bumper or grille work of the vehicle whereas devices 13 and 22 are preferably mounted on the front fenders and point in the direction of travel of the vehicle. Devices 14, 15, 19 and 21 are preferably mounted on the sides of the fenders to detect objects which approach the vehicle transversely with respect to its direction of travel. Devices 16, 17 and 18 are directed toward the rear of the vehicle to sense the presence of objects approaching the back fenders or bumpers. In addition to the above, devices 20 and 23 are mounted on the doors of the vehicle in order to protect the doors from possible collision with external objects.

As vehicle 10 passes or approaches another object or vehicle 24, the corresponding ultrasonic detectors are capable of sensing the distance between the vehicle 10 and the object and provide a warning to the drive if the vehicle closes its distance with respect to the object by a predetermined clearance. In FIG. 14, ultrasonic detector 14 protects the front right fender of the vehicle against external object 24 which may consist of another vehicle, e.g. parked in a parallel parking space. As vehicle 10 enters or leaves the adjacent parking space, the driver will receive a warning on indication panel 26 (FIG. 2) mounted on dashboard 25 if the fender becomes too close to object 24.

FIG. 14 shows the cam switch S1, and associated transmitter 28 and receivers for the front and rear transducers disposed to the right of the dashboard, and the cam switch S2, and associated transmitter 128 and receivers for the right and left side transducers on the left hand side of the dashboard.

Figure 1:
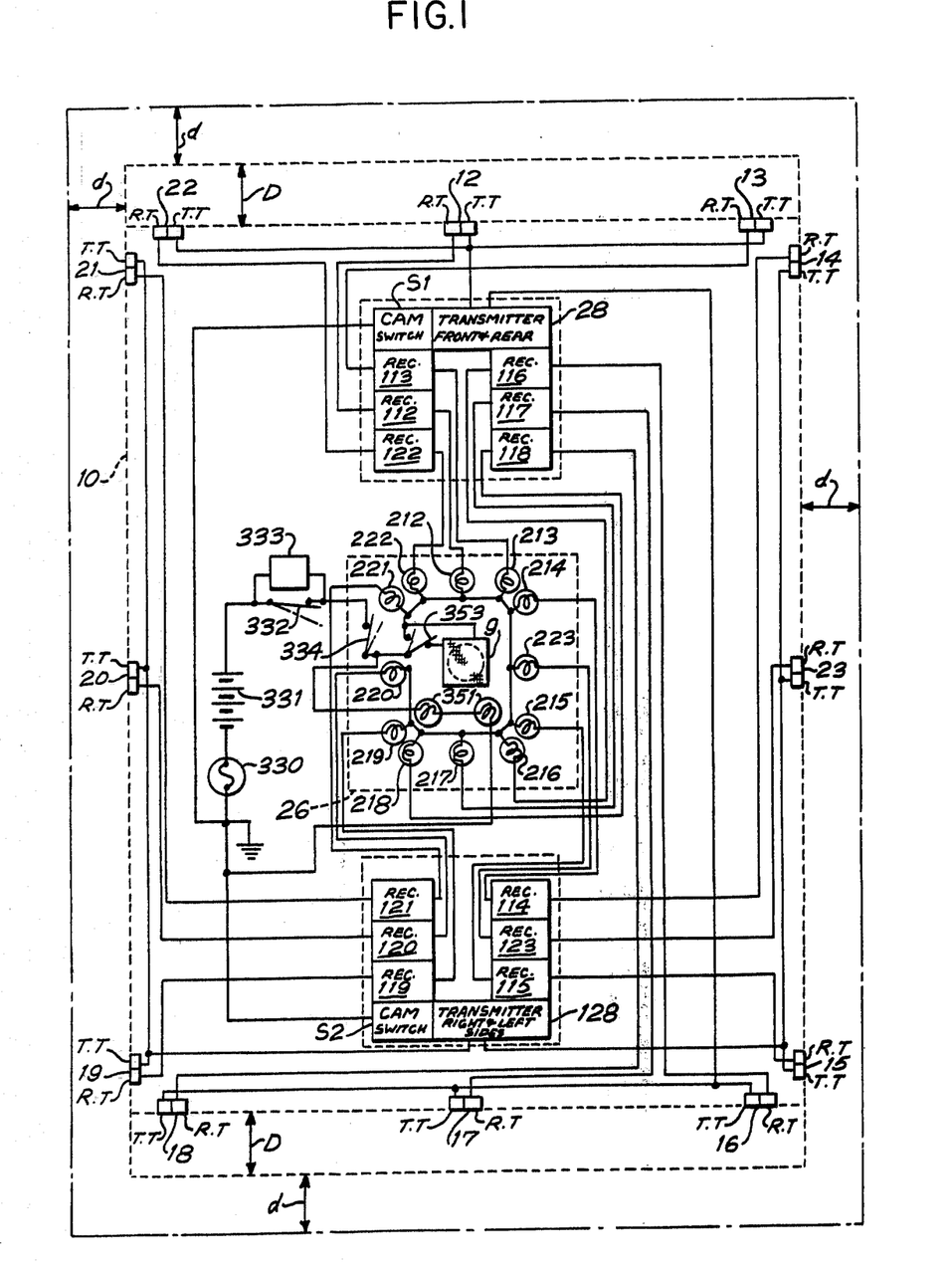
FIG. 1 is an electrical schematic diagram of the ultrasonic detection device according to the invention.

Referring now to FIG. 1 an electrical schematic diagram of the ultrasonic detection system according to the invention shows the location of detectors 12-23 and their individual electrical connection to indicator 26. Each of the detectors 12-23 include a transmitter transducer T.T, a receiver transducer R.T and a relay receiver comprising individual receivers 112-123, respectively, and for the front and rear transducers a single cam switch S1, and a transmitter 28, and for the side transducers, a single cam switch S2 and a transmitter 128. The cam switches are for switching between the respective transmitter and the receiver for controlling an individual ultrasonic transducer. The output of each receiver 112-123 of detectors 12-23 is connected to a respective indicator lamp 212-223 mounted within indicator 26 on the dashboard of the vehicle. Indicator 26 is connected to the battery 331 of the vehicle through fuse 330 and ignition on-off switch 332, which is in parallel to on-off time delay switch 333, and manual on-off switch 334. Each of the lamps can be further connected to a horn or buzzer 9 so that if one or more lamps is energized, switch 353 will close so that the horn will alert the driver of a possible collision. If on-off switch 334 is closed and the driver stops, then removes key from ignition, this opens switch 332. Time delay switch 333 will remain closed 60 seconds or more, giving enough time for all passengers to get out, with the unit still on transducers 20 and 23 will help keep the doors from hitting objects by buzzer 9 being activated.

Figure 2:
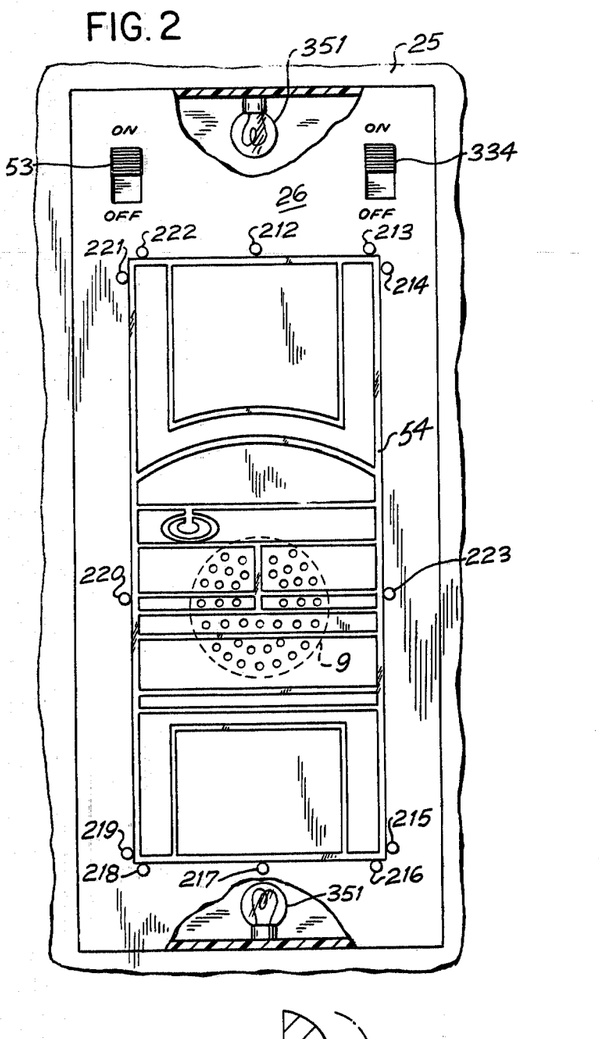
FIG. 2 is a view of a portion of the dashboard of a vehicle showing an indicating and warning device according to the invention.

Referring now to the drawings, and particularly to FIG. 2, a portion of the dashboard 25 is provided with an indicating and warning device panel 26 mounted thereon, which panel 26 contains a picture 54 simulating a vehicle (whether car, bus, truck, boat or the like) with illuminating lights 351 disposed under the panel. (For inexpensive vehicles, the picture 54 can be printed on the panel 26.) Picture 54 is made of a material which permits light to pass through. The lights 351 illuminate only the outline of the simulated car. A plurality of warning lights 212-223 are disposed along the periphery of the simulated vehicle for providing an indication by lighting of the appropriate portion of the vehicle which is in danger of being too close to an object. A manual on-off switch 334 is provided on the panel, as also shown in the circuitry of FIG. 1, as well as a manual on/off buzzer switch 353 also shown in the circuitry of FIG. 1. If only warning lights are desired, then the switch 353 is turned off. If both lights and the buzzer is desired, then both switches are switched to the on position. For a faster orientation for the driver to the simulated vehicle and the conditions that are occurring on his vehicle, the lights 212-223 on the simulated car may also be of different colors. For example, the front lights could be red, the rear lights could be yellow, the right side could be blue, and the left side could be green.

Figure 3:
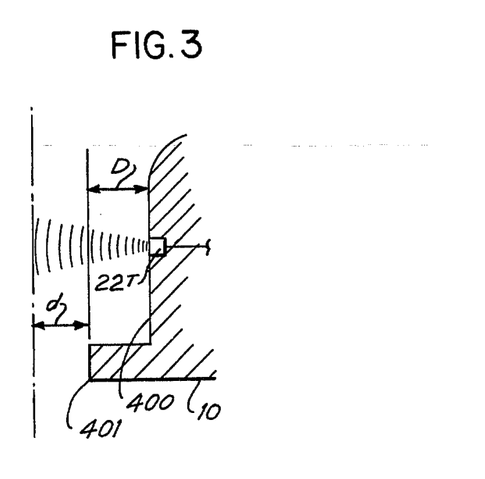
FIG. 3 is a sectional elevation view broken away in part of a transducer mounted on a front or rear of the vehicle.
Figure 4:
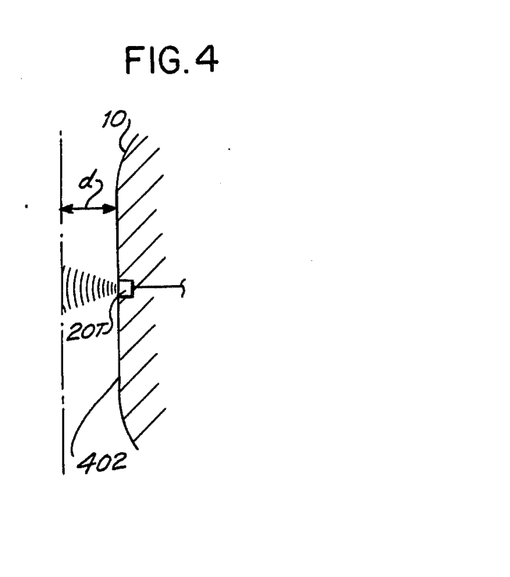
FIG. 4 is a sectional elevation view, broken away in part, of a transducer mounted on a side of the vehicle.
Figure 5:
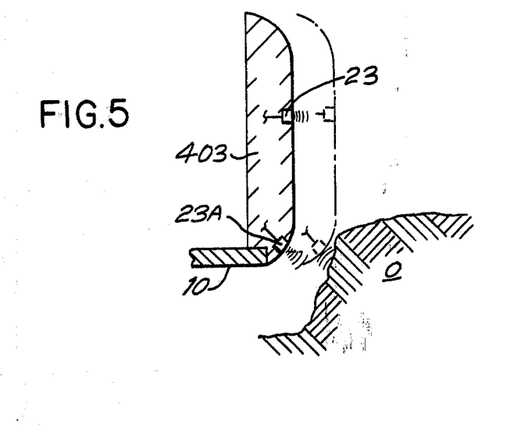
FIG. 5 is a sectional elevation broken away in part of two transducers mounted on a door of the vehicle.
Figure 9:
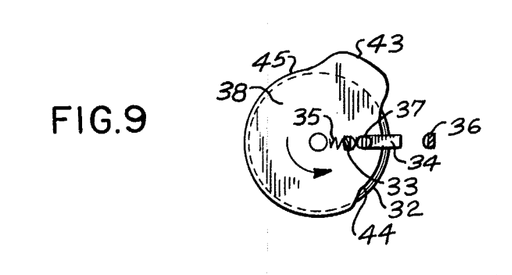
FIG. 9 is a detailed view of the rotary switch of FIG. 7 in another position.
Figure 10:
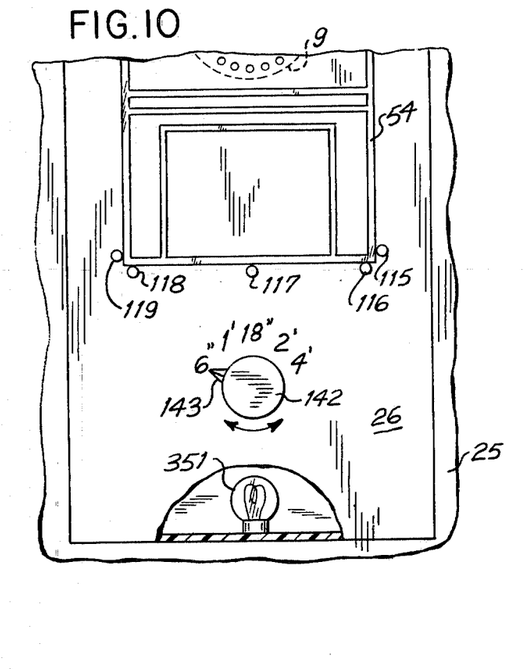
FIG. 10 is a front view of the simulated car panel having a rheostat control for varying the safe distance.

FIGS. 3, 4 and 5, show the device in accordance with the present invention mounted on the front or rear portions of the car (FIG. 3), on the sides (FIG. 4) and on the doors (FIG. 5). In FIG. 3, a dead distance D is to be overcome, namely the space between the surface of the rear or front of the car, namely, surface 400, and the end of the bumper 401, and the cam 38 of FIGS. 7 and 9 as will hereinafter be explained has to be designed to take into account this dead distance D, since the most projecting portion of the vehicle, namely, bumper 401, is the actual surface to be monitored, although the transmitter 22T is disposed at another portion of the front and back of the vehicle. The distance $d$ represents the proper distance to be maintained. As shown in FIG. 4, the transmitter 20T is disposed flat in the side surface 402 of the vehicle 10 and there is no dead distance to be compensated.

As shown in FIG. 5, both transducers 23 and 23A, are disposed on a door 403 of the vehicle and can be connected to the same light on the indicator box or panel of FIG. 2, namely, light 223. In FIG. 5, an object $o$ against which the door is to be monitored, is illustrated.

Figure 6:
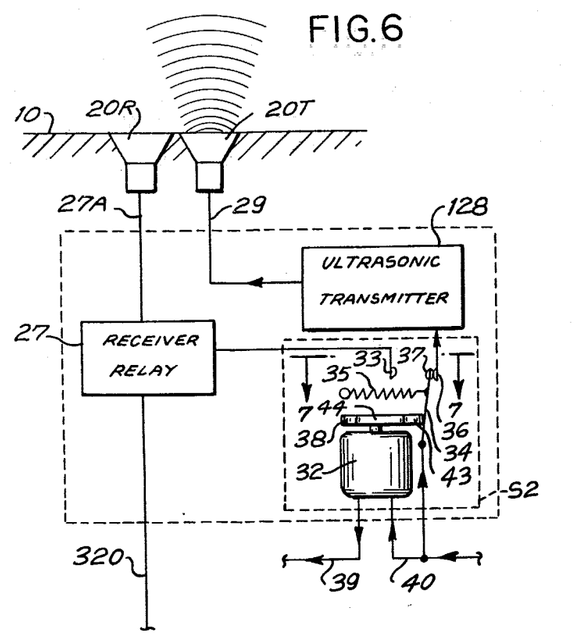
FIG. 6 is an electrical block diagram of one of the ultrasonic detectors in a transmitting mode.

Referring now, again to the drawings, and more particularly to FIG. 6 of a detailed view of an ultrasonic detector 20 which is representative of any of the side detectors on the vehicle. In FIG. 6 an ultrasonic receiving transducer 20R is mounted preferably flat on the surface of vehicle 10 and is connected by means of conductor 27a to receiver 27, and a transmitter transducer 20T also preferably flat on the surface of vehicle 10 is connected by means of conductor 29 to the output of transmitter 128. Transducer 20T is preferably constructed of barium titanate as is well known in the art and is designed to operate preferably in the ultrasonic range of 40–100 kilocycles per second. The output of receiver 27 is connected to line 320 which is connected at its opposite end to lamp 220 as discussed with respect to FIG. 1. The cam switch 52 includes a motor 32 connected to power lines 39 and 40, and on the output shaft of motor 32, a cam 38 having an elongated portion 43 for contact with a switch arm 34. At the end of arm 34 is a switch contact 37 designed for movement between spaced-apart contacts 33 and 36. A spring 35 connected to arm 34 is designed to urge contact 37 against contact 33. When cam 38 rotates to the position shown with respect to FIG. 8, projection 43 releases contact arm 34 so that spring 35 will return contact 37 to contact 33 as arm 34 touches surface 44.

Figure 8:
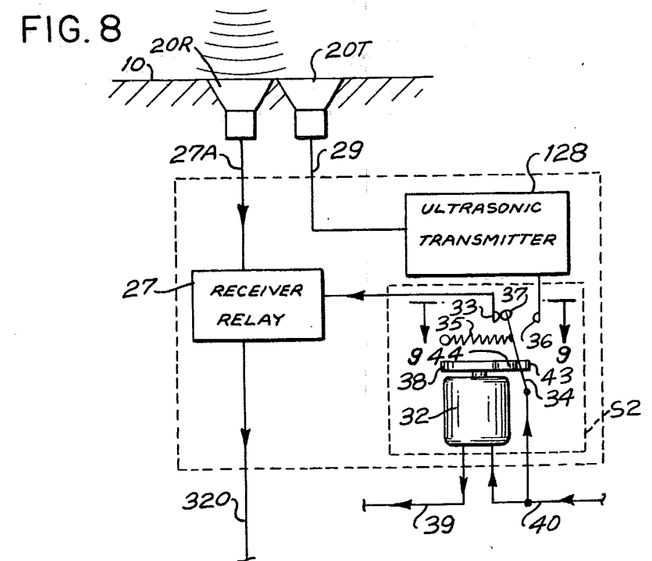
FIG. 8 is a block diagram of the ultrasonic detector of FIG. 6 in a receiving mode.

In operation, when cam 38 is in the position as shown in FIG. 6, power from line 40 will be connected through contact arm 34 and through contacts 36 and 37 to transmitter 128 so that ultrasonic energy will be provided to transmitter transducer 20T to send out a signal from the vehicle. When cam 38 rotates to portion 44 so that contact arm 34 moves contact 37 to engage contact 33, power from line 40 will energize receiver 27 so that return echoes from external objects received by receiving transducer 20R can be received and detected.

Cam 38 mounted on the output shaft of motor 32 is designed to have several caming surfaces so as to initially turn the transmitter "on" and "off", and then turn the receiver "on" and "off" for a predetermined time period. Depending upon the frequency to be transmitted and the speed of motor 32, projection 43 on cam 38 can be designed to turn "on" transmitter 128, so that a few cycles of ultrasonic energy can be transmitted by transducer 20T. After the transmitter is turned off, the receiver can be immediately turned "on" for a specified period of time in order to receive early return echoes for short distances such as 6–12 inches. For periods of time exceeding the desired return echo time, the receiver is silenced when contact arm 34 rides on cam portion 45 so that more distant echoes will not be displayed on indicator 26. Cam portion 45 silences receiver 27 by separating contacts 33 and 37, and the silent period can be sufficiently long so that by the time the next transmission occurs, distant echoes from the previous transmission have been severely attenuated and would not be detected by receiver 27. Likewise, the threshhold level of receiver 27 can be raised so that only close echoes such as those returning from objects within 6–12 inches are detected.

If the transmitter frequency is selected to be approximately 45 kilocycles, the wave length of each transmitted pulse cycle will be approximately ¼ of an inch. If it is desirable to transmit approximately 6–10 cycles, then the speed of cam 38 should be selected so that projection 43 actuates the transmitter for about 1/4500 second. With the speed of sound approximately 1100 feet per second, if it is desirable to sound a proximity warning for distances 6 inches or less from the vehicle, then receiver 27 should be turned on by cam portion 44 for a period of up to 1/1100 of a second. The remaining cam portion 45 of increased diameter removes switch 34 and contact 37 away from contact 33 to shut off the receiver so that no echo sounds will be received beyond six inches. With a change in transmitter frequency to the higher ranges, a faster response is achieved.

The cam 38 may be enlarged so as to perform the switching function for all side detectors so that only a single motor 32 and cam 38 would be required. In that case, a plurality of switches and contact arms would be equally spaced around the cam and operate consecutively as the cam rotates.

Figure 11:
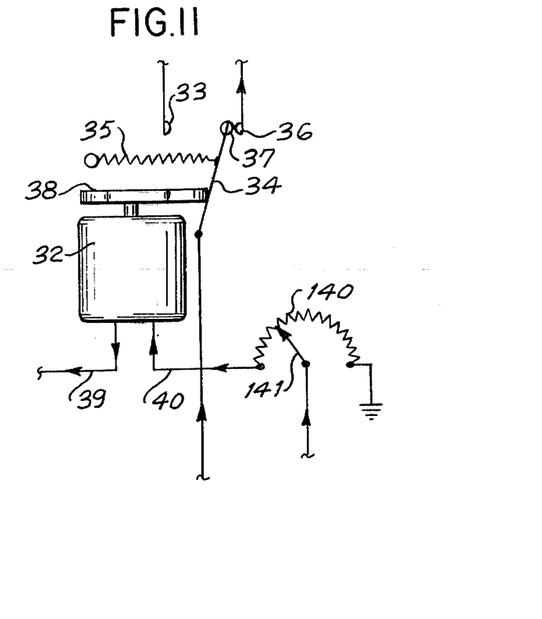
FIG. 11 is a schematic circuit diagram similar to portions of FIGS. 6 and 8, but for the rheostat control of FIG. 12.
Figure 12:
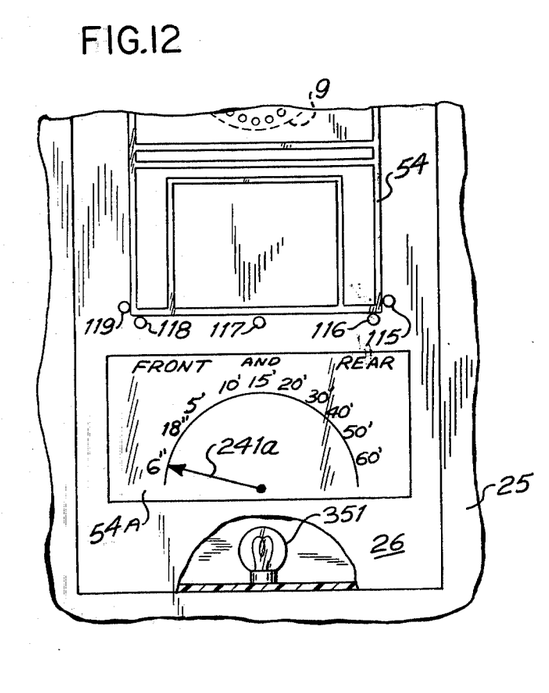
FIGS. 12 and 13, respectively, are views similar to FIGS. 10 and 11, respectively, but for an automatic safe distance speed adjustment device of the invention.
Figure 13:
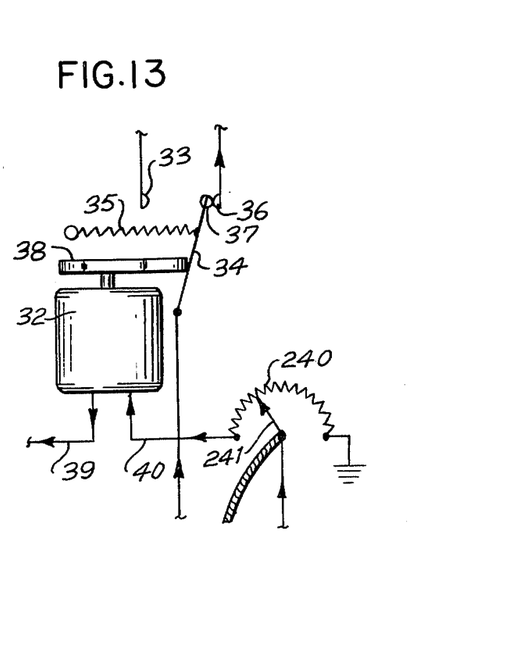

Referring now to the drawings and more particularly to FIGS. 10–13, in accordance with the present invention, there is provided a device which will indicate the distances of a vehicle from objects in the front or back in dependency upon the vehicle travelling speed. Likewise, an indication thereof is provided on the simulated panel when a safe distance from the back or front of the vehicle no longer exists, depending on the speed of the vehicle. For example, when the vehicle is travelling faster, the safe distance should be greater in order to offer more time for stopping in case of an emergency. In FIGS. 11 and 13, the circuitry of this device is illustrated, FIGS. 11 and 13 having the same numerals of that of FIGS. 6 and 8 for correspondingly numbered parts; and the similar parts, namely, the receiver relay, the receiving transducer and transmitting transducer have been omitted since they are the same as in FIGS. 6 and 8. Further, the operation of the device as shown in FIGS. 11 and 13, in other respects is similar to that of FIGS. 6 and 8.

Figure 7:
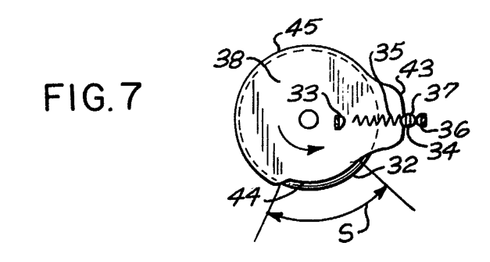
FIG. 7 is a detailed view of a motor driven switch of FIG. 6.

In the embodiment as illustrated in FIG. 11, a manual rheostat 140 is provided for the purposes of checking a prescribed distance. The rheostat 140 is connected between ground and line 40 leading to the motor 32. A sliding rheostat arm 141 is operatively ganged to a moving knob 142 of the rheostat 140 (FIG. 10), which knob 142 is provided on the panel with a pointer 143 pointing to various corresponding safe distances that are to be monitored as preset limits for safety. By rotation of the rheostat knob, the sliding pointer 141 is moved to different points of the rheostat resistance 140 and thereby the control of electricity flow to the cam motor 32 is adjusted, which varies the speed of the motor, thus the speed of rotation of the cam 38. Accordingly, when the speed of the cam is changed, the area S of the cam as illustrated in FIG. 7 which represents the receiving time, causes the switch contact 37 to abut against contact 33, causing the receiver relay 27 to be operative for a time corresponding to the predetermined dialed distance. In this manner, the device is ready to monitor longer or shorter distances as the predetermined safe distance from the vehicle. For greater vehicle speeds, one dials a greater safe distance.

Referring now to the drawings and more particularly to FIGS. 12 and 13, the rheostat 240 is provided with a sliding rheostat pointer 241 which is connected to the input line 40 to the motor 32 as well as being grounded. The pointer slide 241 of the rheostat is operatively ganged to the pivoting dial of the speedometer or to the pivot pin thereof. Thus the pointer 241 moves angularly corresponding to the speedometer dial. The rheostat may be non-linear corresponding to the speedometer. Accordingly, the faster the vehicle goes, the less electricity flows through the rheostat 240 to the motor 32. This causes the motor 32 to correspondingly, slow down, and the output shaft thereof correspondingly slows the cam 38 so that the surface S (FIG. 7) is in contact with the switch 34 for a longer time. By virtue of the contacts 33 and 37 abutting each other during action of cam portion S thereon, the receiver relay is operative for a longer time and receives for a longer time, the reflected sonar echoes. Therefore, during this extra time, if by chance an echo is received, then the indicating device and warning device is actuated, indicating for this speed you are too close to the object. Thus, the faster one travels, the further away one must be for a safe distance. Consequently, the slower the cam rotates, in order to insure that you are away for the safe distance, there must be received no reflected signal during the longer available receiving time. The rheostat is calibrated corresponding to the speedometer dial such that appropriately the proper distance is effected for monitoring. When the speedometer is substantially at zero, as during parking of a car, then the rheostat is at the left hand most point in FIG. 12, that is, the device is now similar to the embodiment described in connection with FIGS. 1 and 6–9, namely, cam switch S2.

With this device, one can receive echoes from greater distances when the motor and cam turn slower. The faster one drives, the longer the cam stays on to connect the switch to receive echoes from objects that are further distances away. When the receiver is cut off, it corresponds to the safe distance from another object for the speed you are travelling. As illustrated in FIG. 12, there is a dial 241a provided on the simulated car panel showing the safe distance corresponding to speed of the vehicle. The dial 241a is operatively ganged to the pointer of the rheostat 241 (FIG. 12), or the speedometer dial or pivot pin.

With respect to FIG. 3 and the front or rear bumpers 401, in order to compensate for the dead distance D, the cam is appropriately adjusted so that the operative signal only reads the distance $d$, which is the same safe distance as in FIG. 4 with respect to the sides 402 of the vehicle.

The switching for each of the detectors can also be done electronically by solid state circuitry. In this case, the transmitter 128 would be designed to turn on and off several times per second to send out bursts of 6–10 cycles and operate receiver 27 between each burst for a predetermined time interval. The time interval could be adjustable or fixed so that a predetermined echo return time could be measured to be equivalent to six inches in distance.

Figure 15:
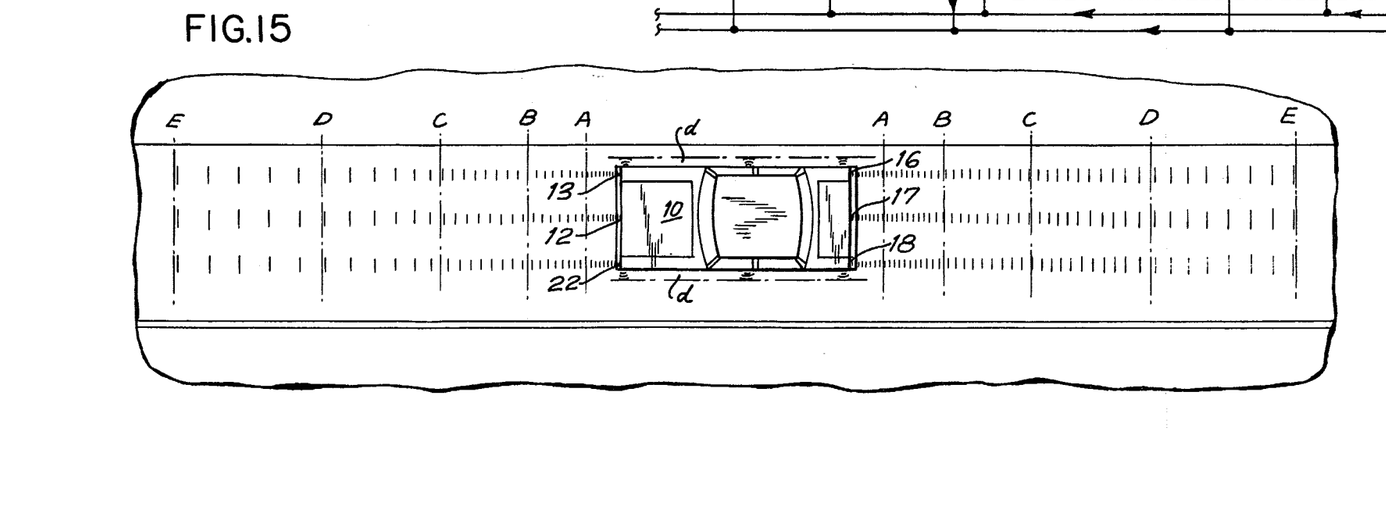
FIG. 15 is a top plan view of the vehicle showing various safe distance zones mapped in dependency on speed.

As illustrated in FIG. 15, safe distance ranges are mapped adjacent the front and rear of the vehicles for different speeds. For example, A represents the safe distance for a vehicle travelling 10 miles an hour, B, 20 miles an hour, C, 30 miles an hour, D, 40 miles an hour, and E, 50 miles an hour. As may be noted, the different distances do not increase linearly. In accordance with the device in accordance with FIGS. 12 and 13, when an object is inside the range of the safe distance for the particular speed, the alarm indication is provided. If an object is in front, the driver hits the brakes, if an object is in the back, the driver is alerted to look through his rear view mirror and step on the gas or take other satisfactory precautionary driving measures.

Figure 16:
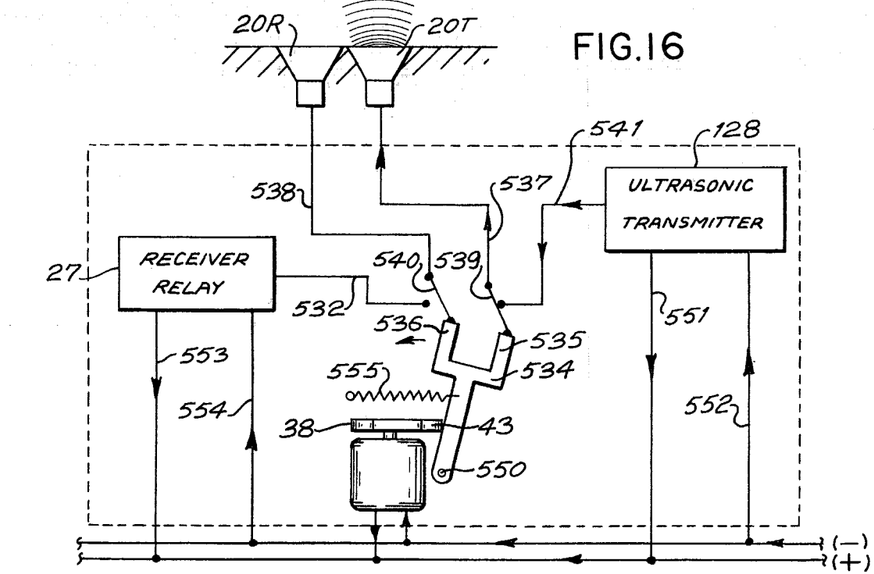
FIG. 16 is a circuit diagram of an alternate embodiment of the invention.

Referring again to the drawings and more particularly, to FIG. 16, there is shown another embodiment of the present invention similar to that of FIGS. 6 and 8. Like portions of the corresponding figures are numbered with the same numbers, and further description of the like parts are not mentioned. The switch is formed here as a forked lever 534 which is pivoted about a fixed pivot point 550 and biased toward the cam 38 by spring 555. In this embodiment, the ultrasonic transmitter 128 is connected at all times to lines 551 and 552 to the plus and minus power lines, and the receiver relay 27 is connected by lines 553 and 554 to the plus or minus power lines. After the system is on, by having the ultrasonic transmitter 128 and receiver relay 27 on at all times, and by switching the wires going to the transducers and always connected to the two forked pronged ends 535 and 536 of the lever 534, the system is provided with a faster response. The line 537 is always connected to the transmitter transducer 20T, and the line 538 is always connected to receiving transducer 20R. The lines 537 and 538 are connected to the ends of the forks 535 and 536, by gang switch leads 539 and 540, respectively.

In the position illustrated in FIG. 16 with the forked lever 534, as shown in the position to the right, when biased outwardly by the cam projection 43 (FIGS. 7 and 9), only the gang switch lead 539 is connected; the gang switch lead 540 is disconnected from the receiver relay 27. In this position the ultrasonic transmitter 128 is connected with the transmitter transducer 20T via lines 541, 539 and 537 for sending out sonic signals. As the cam rotates to the portion S (FIGS. 7 and 9), the spring causes the lever 534 to swing to the left, disconnecting lead 539 from the transmitter 128, and connecting the receiver relay 27 to the receiving transducer 20R via gang switch lead 540 for receiving any incoming signals; then only the receiver relay 27 is connected to the receiver transducer 20R via lines 532, 540 and 538 by switch lever 534.

While only several embodiments of the present invention have been shown and described, it will be obvious to those skilled in the art that many changes and modifications may be made thereunto without departing from the spirit and scope of the invention.

What is claimed is:

1. An ultrasonic distance determining device for use on vehicles and the like comprising:
   a plurality of ultrasonic transmitting transducers and receiving transducers each located along the back and front of the vehicle;
   an ultrasonic transmitter means having its input coupled to each of said transmitting transducers, said transmitter means comprising an individual transmitter coupled to the input of said transmitting transducers;
   a relay receiver coupled to each of said receiving transducers, said relay receiver comprising an individual receiver coupled to the output of each of said receiving transducers;
   switch means coupled to the input of said transmitter means and said individual receiver so as to selectively operate said ultrasonic transmitter means for each of said transmitting transducers and then operate a corresponding one of said receiver relays for a predetermined time interval;
   indication means comprising a plurality of indicating lamps wherein each of said lamps are connected respectively to the output of said relay receiver for providing an indication of the proximity of external objects located a predetermined distance from the vehicle corresponding to the predetermined time interval of the individual receiver for each of said transducers; and
   said switch means comprising at least one motor, cam means connected to the output shaft of said motor, and electrical contact means coupled to said cam means and responsive thereto for alternately switching between said ultrasonic transmitter means and said relay receiver, said motor having input terminals operatively being connected to a power source, and a rheostat connected to one of said input terminals, said rheostat being operatively connected to a speedometer of the vehicle, and including a sliding pointer for changing the resistance thereof corresponding to predetermined safe distances to be monitored.

2. The ultrasonic distance determining device as recited in claim 1, further comprising:
   a dashboard in the vehicle;
   a dial formed on a portion of said dashboard, said dial is coordinated and calibrated to the corresponding safe distances and to said sliding pointer.

3. The ultrasonic distance determining device as recited in claim 1, wherein
   said electrical contact means includes a two prong forked pivot lever cooperating with said cam means and having two ganged lines connected to said receiving transducer and to said transmitting transducer and to the two prongs, respectively, of said lever, said two ganged lines being disposed movably with said lever adjacent an output line from said ultrasonic transmitter and an input line to said receiver relay, for alternate operative connection therebetween.

4. The ultrasonic distance determining device as recited in claim 1, wherein said transmitter is operable at high ranges providing a faster response.

5. The ultrasonic distance determining device as recited in claim 1, further comprising an on-off ignition switch means for operatively disconnecting said indicating lamps, and a time delay switch means connected across said ignition on-off switch means for maintaining an operative connection to said indicating lamps for a predetermined time after said on-off ignition switch means is opened.

6. The ultrasonic distance determining device as recited in claim 1, further comprising:
   a dashboard in the vehicle having a panel, and
   a simulated vehicle formed on said panel of said dashboard, said indicating lamps include lamps of different colors disposed on each side of said simulated vehicle.

7. The ultrasonic distance determining device as recited in claim 1, further comprising an additional transmitter means and an additional receiver means disposed at a bottom of doors of the vehicle and operatively connected to said indication means for indication of safety distances of the doors from objects.

8. The ultrasonic distance determining device as recited in claim 6, further comprising means for illuminating said simulated vehicle on said dashboard.

9. An ultrasonic distance determining device for use on vehicles and the like comprising:
   a plurality of ultrasonic transmitting transducers and receiving transducers each located along the back and front of the vehicle;
   an ultrasonic transmitter means having its input coupled to each of said transmitting transducers, said transmitter means comprising an individual transmitter coupled to the input of said transducers;
   a relay receiver coupled to each of said receiving transducers, said relay receiver comprising an individual receiver coupled to the output of each of said receiving transducers;
   switch means coupled to the input of said transmitter means and said individual receiver so as to selectively operate said ultrasonic transmitter means for each of said transmitting transducers and then operate a corresponding one of said receiver relay for a predetermined time interval;
   indication means comprising a plurality of indicating lamps wherein each of said lamps are connected respectively to the output of said relay receiver for providing an indication of the proximity of external objects located a predetermined distance from the vehicle corresponding to the predetermined time interval of the individual receiver for each of said transducers;
   a dashboard in the vehicle having a panel; and
   a simulated vehicle formed on said panel on said dashboard, said indicating lamps include lamps of different colors disposed on each side of said simulated vehicle; and
   said switch means comprising at least one motor, cam means connected to the output shaft of said motor, and electrical contact means coupled to said cam means and responsive thereto for alternately switching between said ultrasonic transmitter means and said relay receiver, said motor having input terminals operatively being connected to a power source, and a rheostat connected to one of said input terminals, said rheostat being operatively connected to a speedometer of the vehicle, and including a sliding pointer for changing the resistance thereof corresponding to predetermined safe distances to be monitored.

10. The ultrasonic distance determining device as recited in claim 9, wherein said simulated vehicle is printed on said panel of said dashboard.

* * * * *